C. O. WYMAN.
REAPER AND BINDER.
APPLICATION FILED JULY 17, 1905.
943,856.
Patented Dec. 21, 1909.
8 SHEETS—SHEET 2.
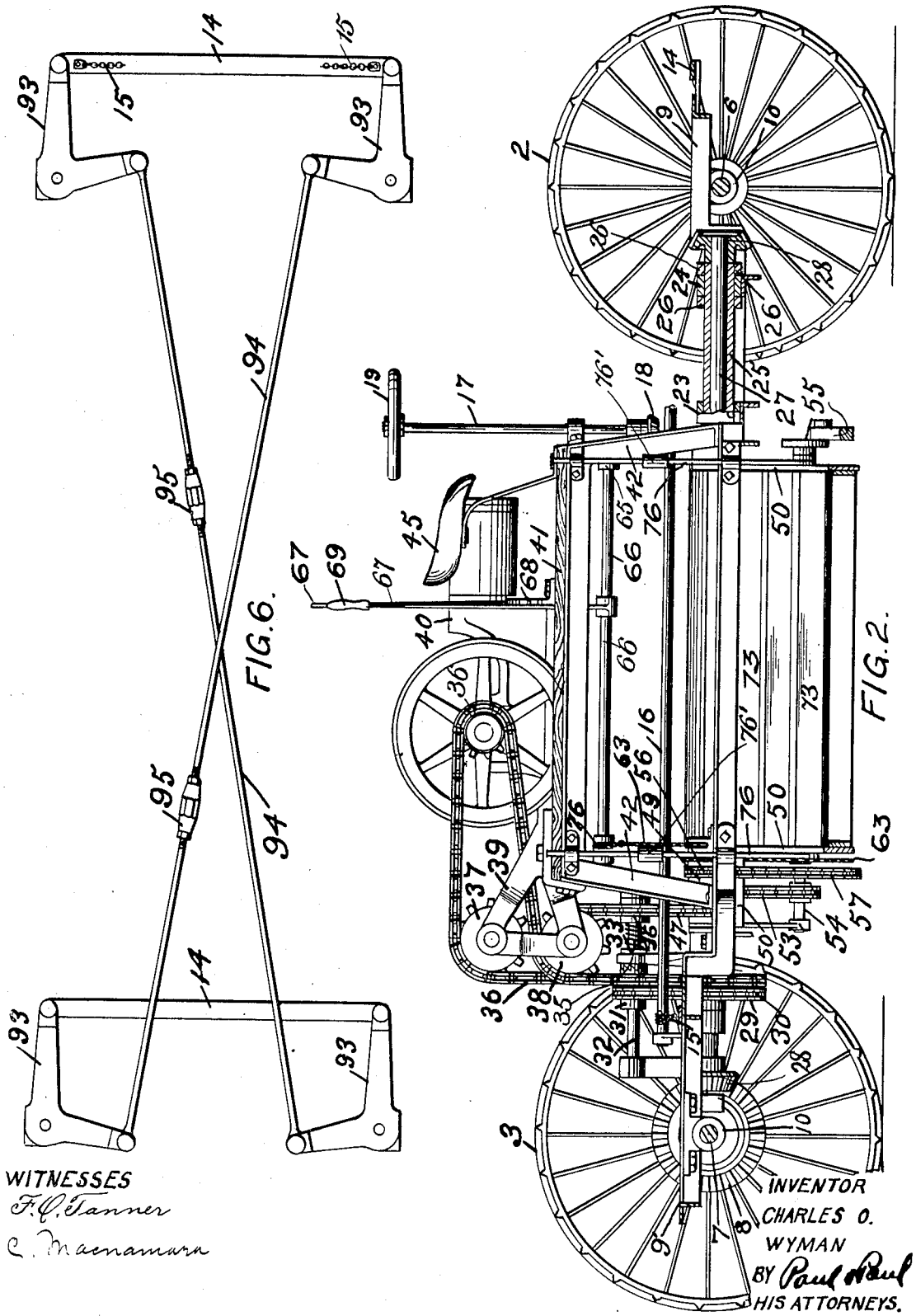
WITNESSES
F. C. Tanner
C. Macnamara
INVENTOR
CHARLES O. WYMAN
BY Paul & Paul
HIS ATTORNEYS.

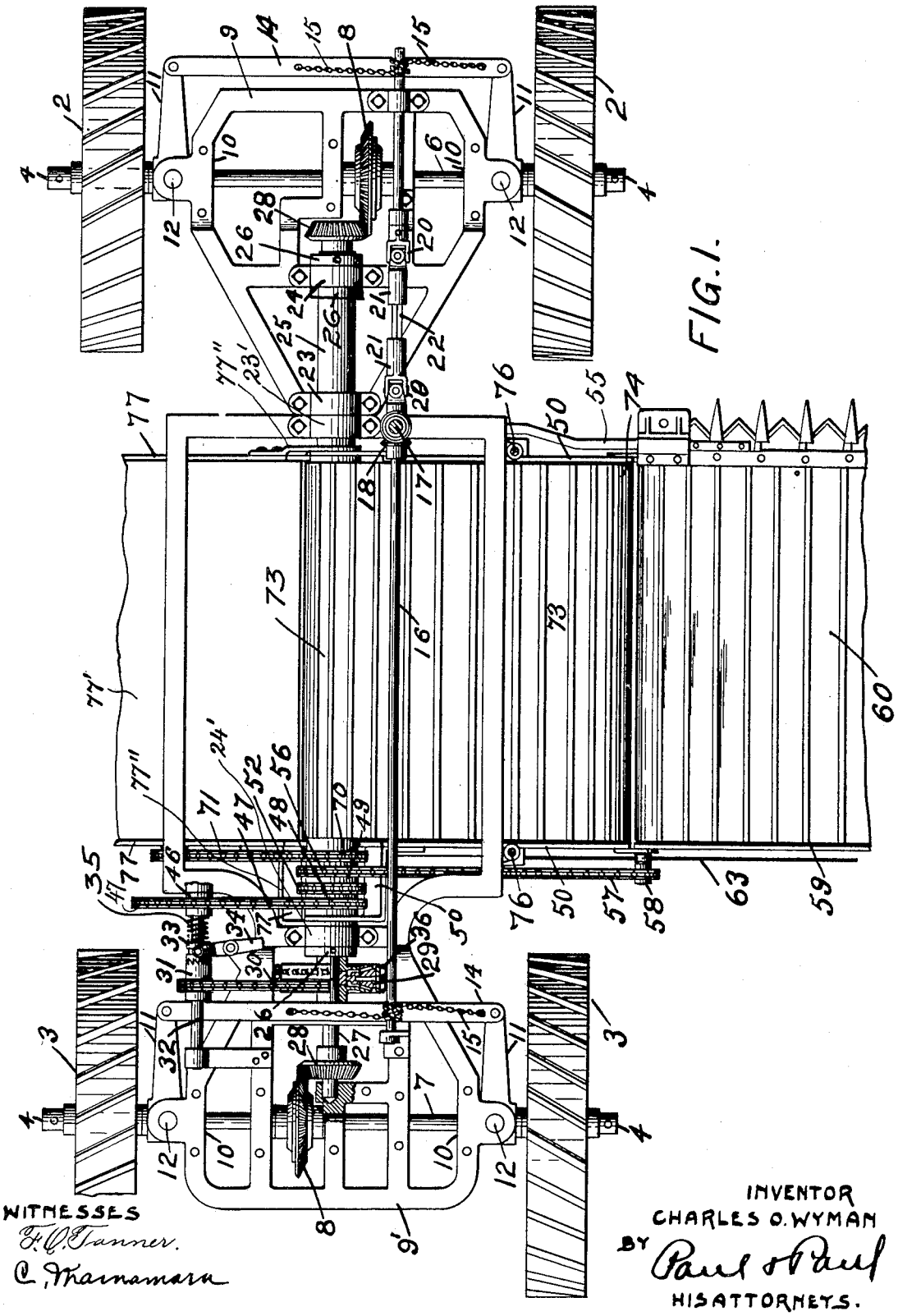

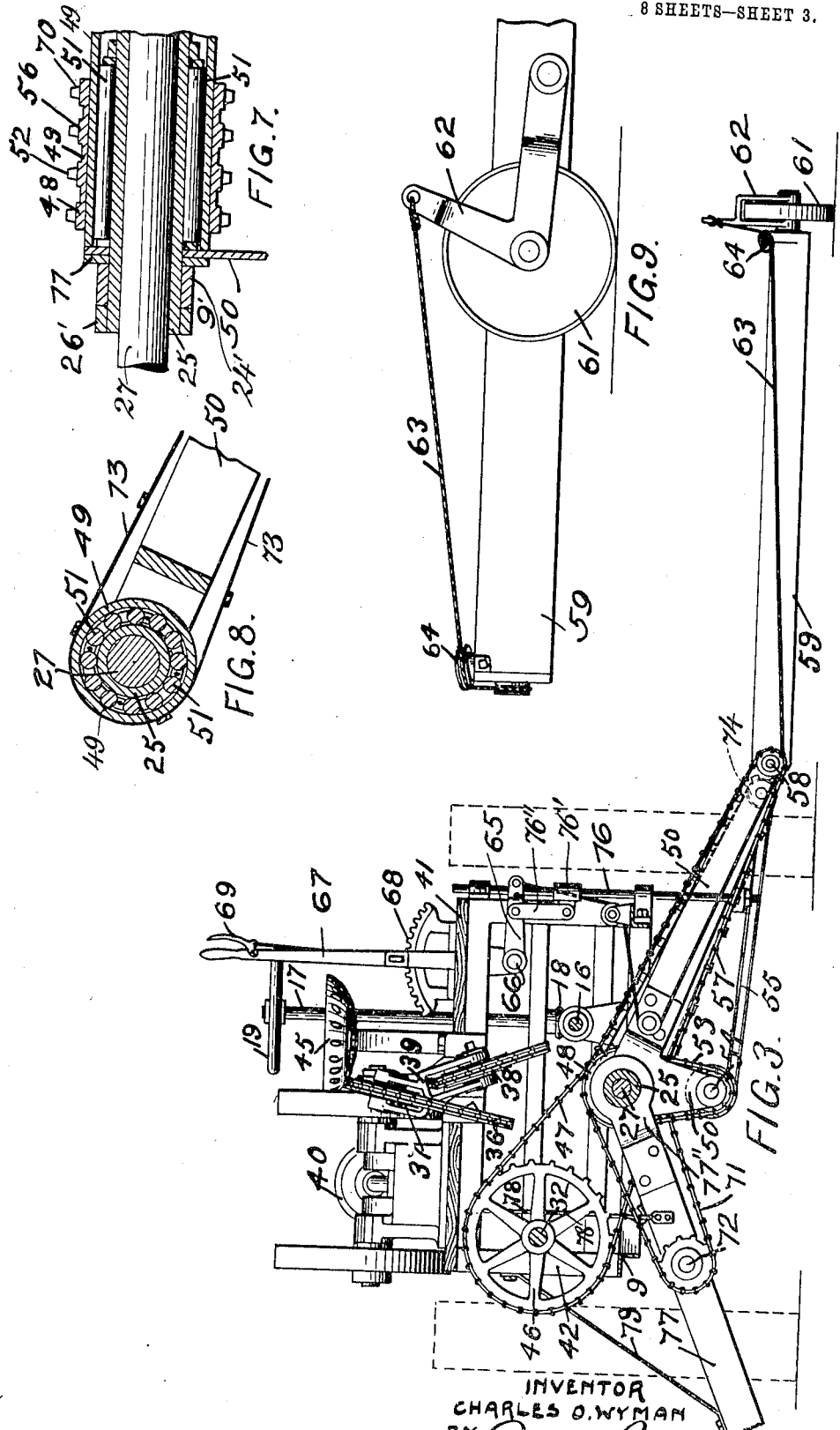

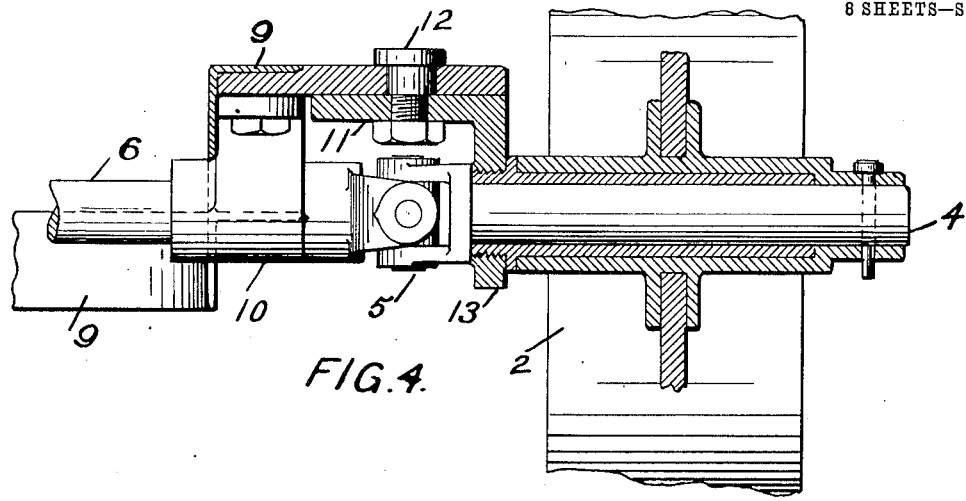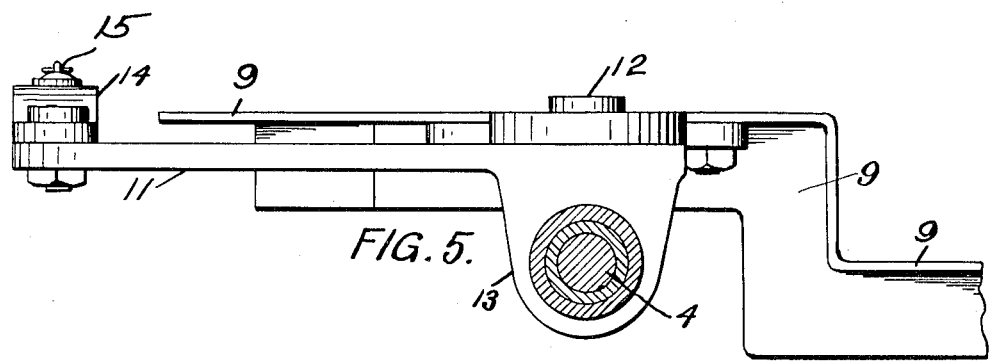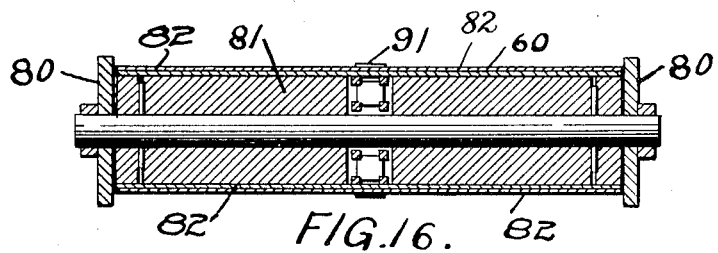

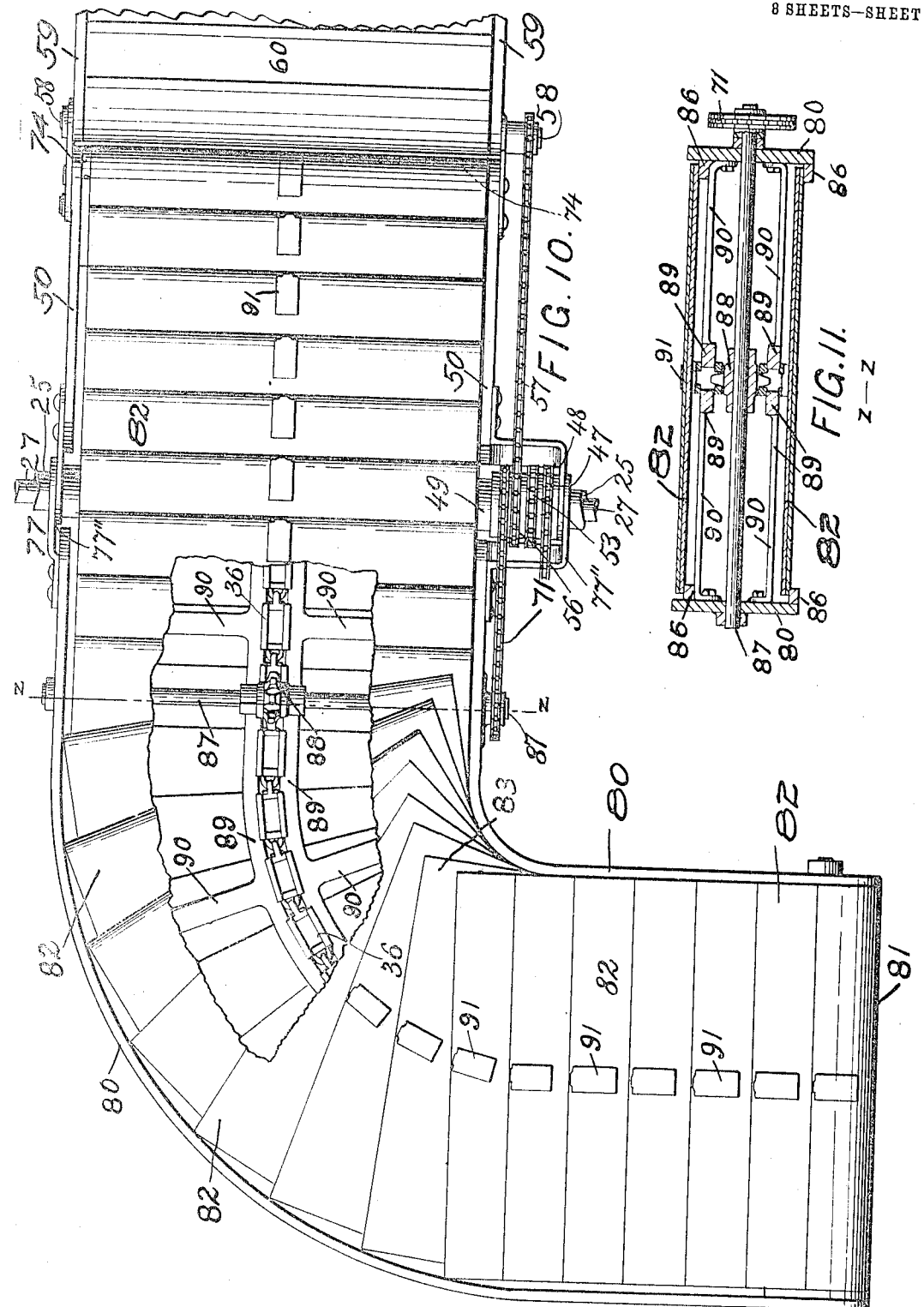

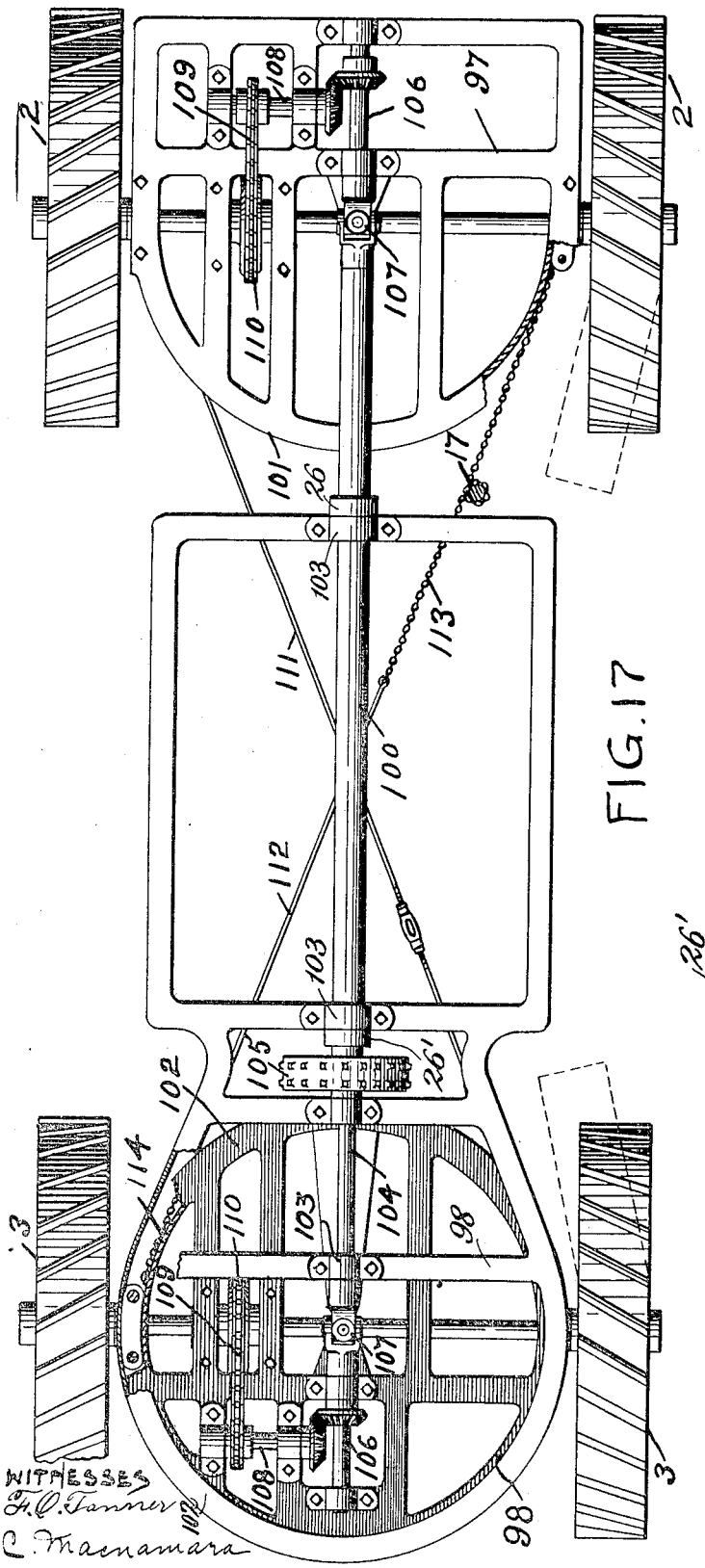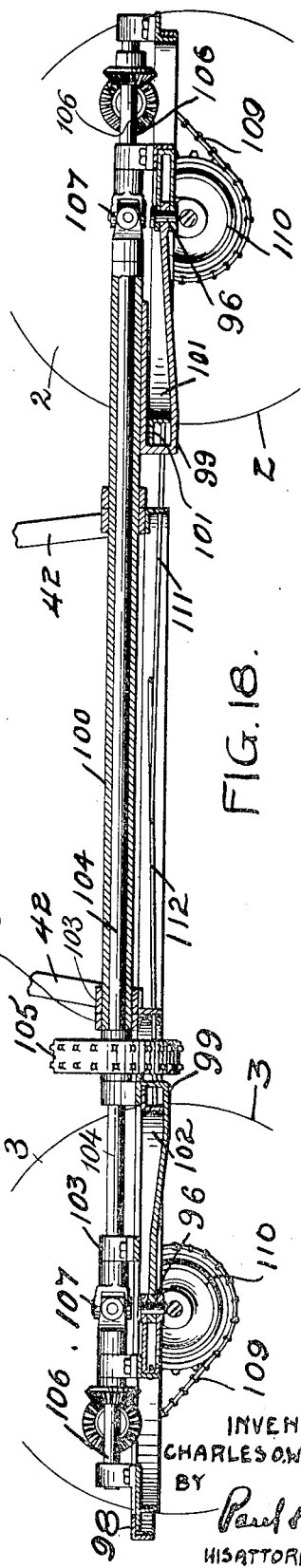

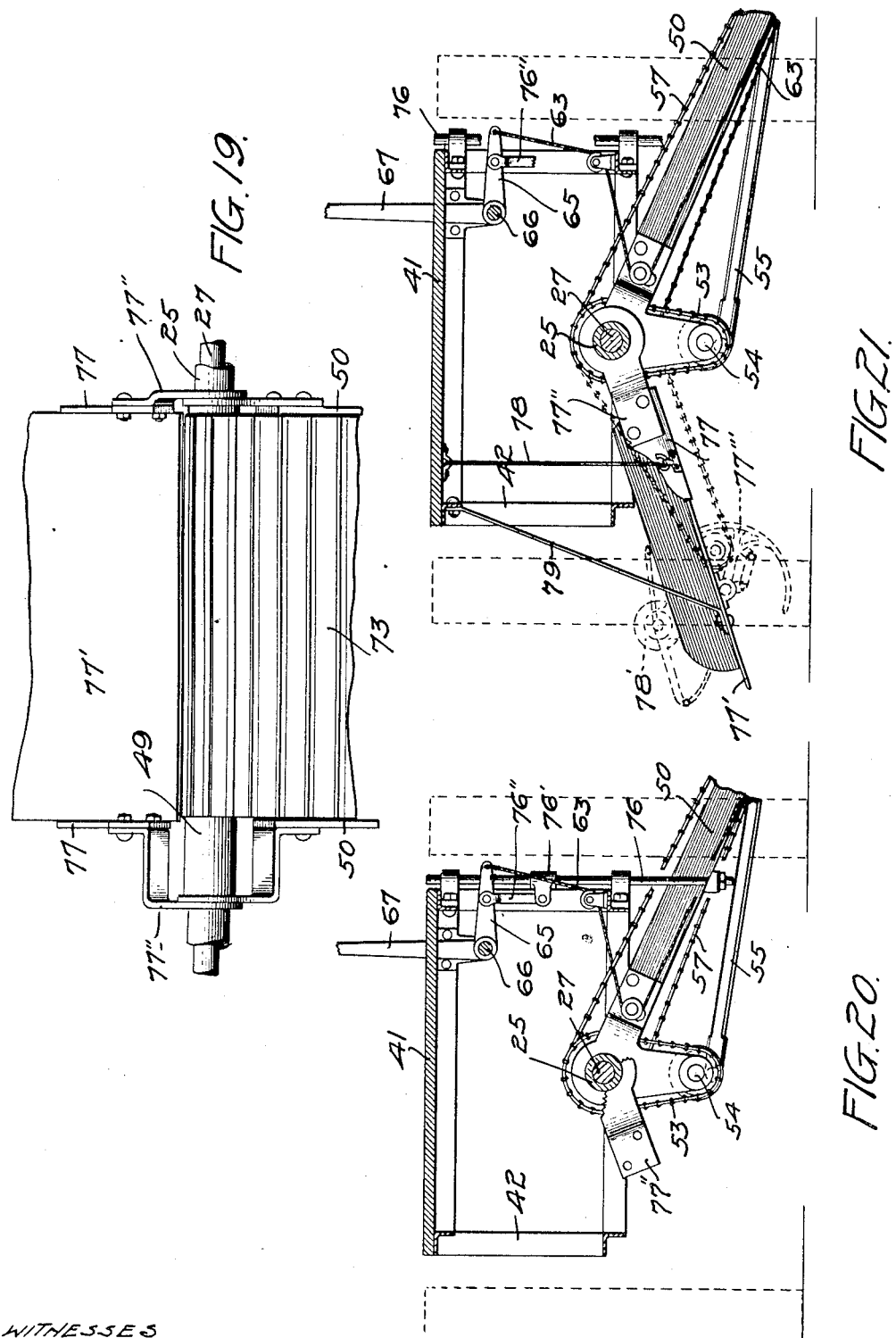

UNITED STATES PATENT OFFICE.

CHARLES O. WYMAN, OF ANOKA, MINNESOTA.

REAPER AND BINDER.

943,856.   Specification of Letters Patent.   Patented Dec. 21, 1909.

Application filed July 17, 1905. Serial No. 270,052.

*To all whom it may concern:*

Be it known that I, CHARLES O. WYMAN, of Anoka, Anoka county, Minnesota, have invented certain new and useful Improvements in Reapers and Binders, of which the following is a specification.

My invention relates to agricultural machinery, and the object of the invention is to provide a machine capable of being used interchangeably as a reaper alone or as a combined reaper and binder.

A further object is to provide a machine in which the power for operating the reaping mechanism is also applied to the traction wheels to drive the machine across the field.

A further object is to provide a machine that will be comparatively light and easy running and inexpensive in construction and maintenance.

Other objects of the invention will appear from the following detailed description.

The invention consists generally in various constructions and combinations, all as hereinafter described and particularly pointed out in the claims.

Figure 14:
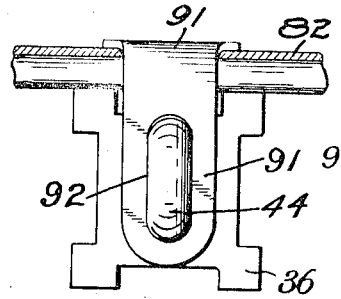
Figure 15:
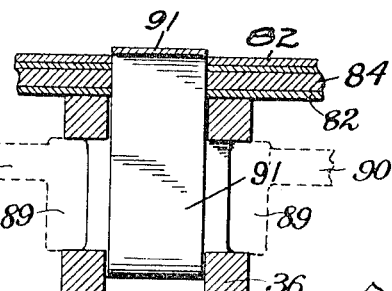
Figure 12:
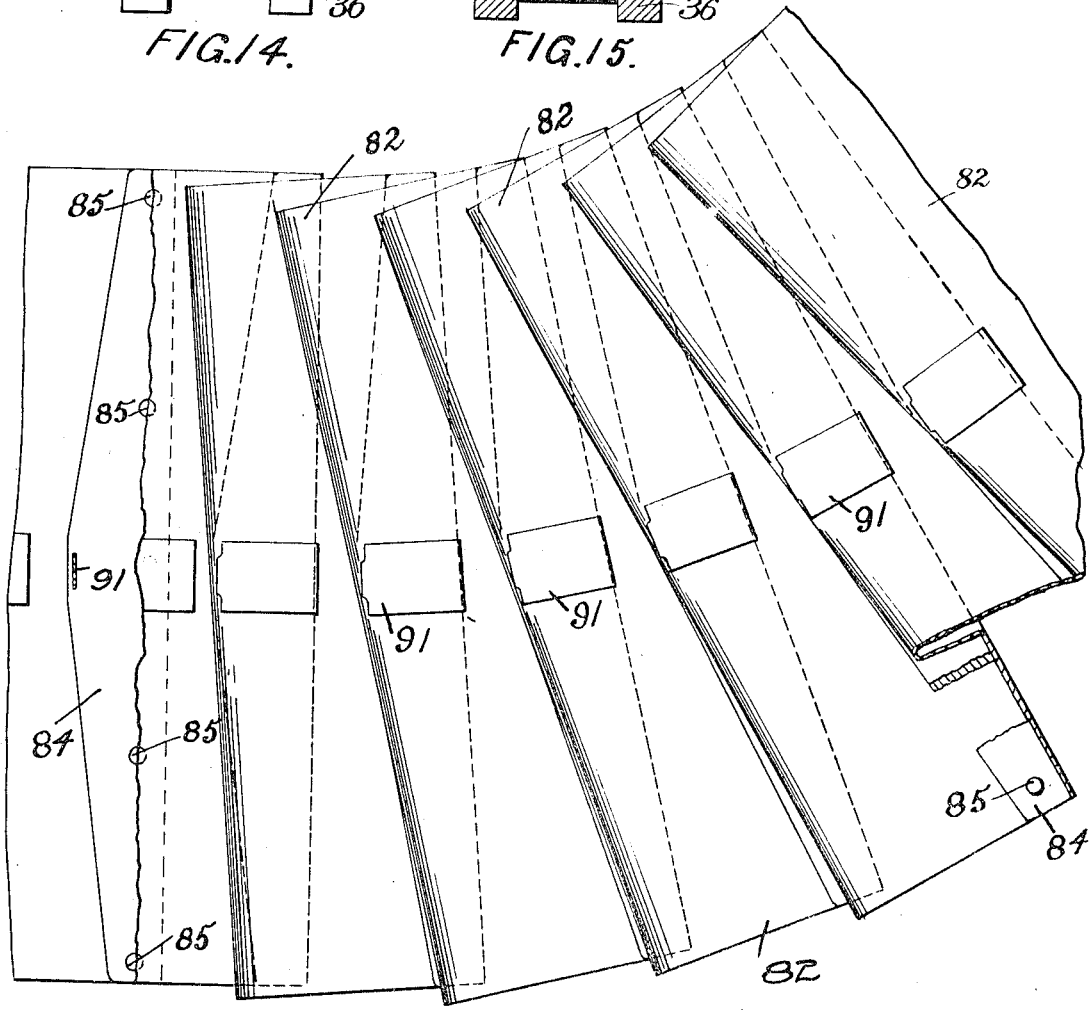
Figure 13:
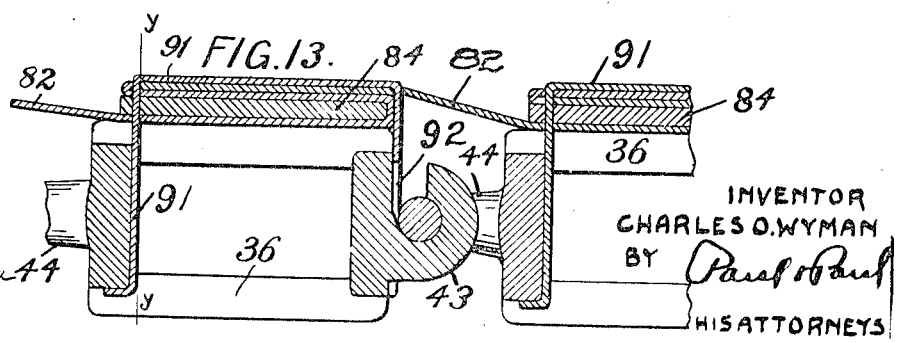

In the accompanying drawings forming part of this specification, Figure 1 is a plan view of a machine embodying my invention. Fig. 2 is a longitudinal vertical section. Fig. 3 is a transverse section showing the manner of supporting the binder deck on the hollow reach. Figs. 4 and 5 are details showing the manner of mounting the wheels of the machine on their axles, and showing the vertical pivot that allows each wheel to swing horizontally with respect to its axle. Fig. 6 is a modification in detail of the manner of transmitting the movement from the forward to the rear wheels. Figs. 7 and 8 are details illustrating the manner of mounting the roll on the hollow reach. Fig. 9 illustrates the device for raising the knife bar platform. Fig. 10 is a plan view of the form of apron or belt employed for depositing the grain or grass at the rear of the machine. Fig. 11 is a sectional view on the line z—z of Fig. 10. Fig. 12 is a detail view illustrating the manner of folding or crimping the belt at the point where the turn is made therein. Fig. 13 is a sectional view illustrating the manner of mounting the belt on its operating chain. Fig. 14 is a detail of the device for securing the belt to the chain. Fig. 15 is a sectional view on the line y—y of Fig. 13. Fig. 16 is a sectional view through the roll around which the belt passes. Fig. 17 is a plan view of a modified construction of running gear and mechanism for oscillating the traction wheels. Fig. 18 is a longitudinal section of Fig. 17. Fig. 19 is a plan view of a portion of the harvester elevator belt, and the laterally extending grass-delivering apron or belt removably mounted on the hollow roll. Fig. 20 is a transverse sectional view showing the side delivery belt detached from the hollow roll. Fig. 21 is a similar view illustrating a binder mechanism substituted in place of the rearwardly-delivering belt.

In the drawing, 2 represents the forward wheels and 3 the rear wheels supporting the frame of my machine. These wheels are all mounted on spindles 4 that have universal joint connections 5 with the forward and rear axles 6 and 7, each of which is formed in two sections or parts with compensating gears 8 between them to allow one wheel and its section to travel faster than the other, as when the machine is rounding a turn.

A frame consisting of sections 9 and 9′ (preferably of angle bar material on account of its strength and rigidity in comparison with its weight) is mounted upon the axle sections having bearings 10 thereon, and arms 11 are pivoted by bolts 12 upon said frame and have lugs 13 that embrace the spindles 4, to oscillate the same forward or back when said arms are reciprocated. The opposite arms at the same end of the machine are connected by cross bars 14, and chains 15 connect said cross bars with a horizontal shaft 16 that has bearings on said frame, and is revolved in either direction by means of a vertical post or standard 17 having a gearing connection 18 with said shaft, and provided with an operating wheel 19. Universal joints 20 are inserted in said shaft connecting the forward and rear sections thereof, and sockets 21 are provided between said joints and adapted to receive a rod 22 that has a sliding bearing in said sockets and is polygonal in cross section to prevent its rotation independently of said shaft, while its sliding connection with said sockets allows the forward portion of the machine frame and the wheels to rise and fall with the inequalities of the ground without affecting the shaft or its connections.

The frame sections 9 and 9′ have oscillating bearings 23 and 24 and 23′ on a hollow reach 25 that connects the forward and rear axles along the middle line of the machine and is held in proper relation with the said frame and axles by means of collars 26 and 26' provided on the ends of said reach, as shown in Figs. 1 and 2. This connection between the frames and reach allows the vertical oscillation of said frames and their axles without twisting or straining the reach and the driving mechanism inclosed thereby. A driving shaft 27 is arranged in said reach and provided with gears 28 at its forward and rear ends meshing with the contiguous compensating gears and transmitting power thereto from the engine supported on the frame, as will hereinafter appear.

A compensating gear 29 is inserted into the driving shaft near its rear end, and one member of said gear is connected by a chain 30 with a clutch member 31 loosely mounted on a shaft 32 and operating continuously. A second clutch member 33 is splined on said shaft and operated by a lever 34 and adapted to lock the member 31 to revolve the said shaft 32. A spring 35 normally holds the clutch members in engagement with one another. The other member of the compensating gear 29 is connected by a sprocket chain 36 that passes over pulleys 37 and 38 carried by a bracket 39 with an engine 40 (preferably of the gasolene type) arranged upon a platform 41 that is supported upon standards 42 on the machine frame.

The sprocket chain 36 is of peculiar construction, being composed of a series of skeleton links, each having four faces or sides with openings therein to receive the teeth of a sprocket wheel and allows power to be transmitted from one wheel to another without the necessity of having the peripheries of said wheel in line with one another or in the same plane. I make no claim to this chain in this application, as it forms the subject matter of an application for Letters Patent of the United States filed October 16, 1905, Serial No. 282,925.

The position of the wheels 37 and 38 with respect to one another are clearly shown in Fig. 3, where one wheel lies in a plane that would intersect the plane of the other wheel for the purpose of allowing power to be transmitted from a drive pulley or wheel on the engine that is in a plane substantially at right angles to the plane of the compensating gear to which the power is transmitted. Each link of said chain is provided with a hook 43 that is adapted to slip into an eye 44 in the contiguous link when the links are held in a certain position with respect to one another, and the hook cannot be disengaged from the eye until the links are returned to that position; thus all possibility of accidental separation of the links, while the chain is in use, is avoided.

A suitable seat 45 is mounted on the platform 41 near the hand wheel 19, to allow the operator to maintain complete control over the machine.

The shaft 32 is provided with a sprocket wheel 46 connected by a chain 47 with a sprocket 48 secured on a sleeve or hollow roll 49 that is mounted upon the hollow reach 25 between bars 50 constituting the sides of the apron or belt thereon, and between said sleeve and reach roller bearings 51 are provided which allow the sleeve to be freely revolved with comparatively little friction. (Figs. 7 and 8.) A sprocket wheel 52 is secured on said sleeve near the wheel 48, and has a drive chain 53 connecting it with a shaft 54, having a pitman rod connection 55 at one end from which the knife bar is driven in the usual way. (Figs. 1 and 2.) A third sprocket 56 is secured on said sleeve and has a chain 57 connecting it with a shaft 58 on which the frame 59 of a belt or apron 60 is hinged, said belt forming the knife bar platform upon which the grain or grass falls when cut by the knife. (Figs. 1 and 3). A wheel 61 is carried by said frame and adapted to support the outer end of the same the desired distance above the ground, and a bracket 62 mounted on said frame and wheel has a flexible connection 63 over pulleys 64 with an arm 65 secured on a rock shaft 66 provided with an operating lever 67 that has the usual rack 68 and locking latch 69. (Figs. 3 and 9.) A fourth sprocket 70 is provided on the revolving sleeve connected by a chain 71 with a shaft 72 which drives the binding mechanism. An elevator belt 73 passes around an idle roll 74 and also around the sleeve 49 between the series of sprocket wheels thereon at one end, and its opposite end and bars 50 support the idle roll 74 and are normally at an incline, as indicated in Fig. 3, the belt 73 acting as an elevator for the grain or grass and supported at the desired angle by a suitable hanger 76. A collar 76' is secured on the hanger 76 and adapted to slide vertically therewith in suitable guides on the machine frame, and is connected by a link 76'' with the arm 65. When, therefore, the lever 67 is moved toward the left in Fig. 3 the hanger 76 will be raised to lift the frame 50 to a horizontal position, and at the same time the connection 63 with the frame 59 will be put under tension and the knife bar and platform raised also.

The binding mechanism, such as the packer arms, needle and knotter, are operated from the shaft 72 in the usual manner, and are shown in Fig. 21 wherein a frame 77 connected with the platform 41 by a link 78 and carrying the binder deck 77' forms a continuation of the elevator 73, and is bolted to brackets 77'' loosely mounted on the hollow roll 49. A needle 77''' and knotter 78' are provided in connection with the binder deck, but form no part of my present invention and detailed illustration will be unnecessary. A brace 79 connects the binder deck with the machine frame, but is detachable to allow the convenient removal of the deck from the machine.

The frame 77, with the binder deck thereon, when mounted on the brackets 77'', will adapt the machine for binding the grain brought up by the elevator 73, and the machine so equipped may be used as a combined reaper and binder in the usual way. It is sometimes desirable, however, to provide a mechanism for reaping grass, especially, and depositing it at the rear of the machine, so that the stalks will lie substantially at right angles to the position they would have occupied after the passage of the cutter bar. The grass gathered in this way is not only removed from the path of the machine while making the next cut, but is also laid in convenient position to be subsequently picked up by a gleaning machine. With this end in view I provide a frame 80 adapted to be bolted to the brackets 77'' in the same manner as the frame 77 and in place thereof, and having a rear end that is curved backwardly substantially at right angles to the forward portion of the frame, as shown in Fig. 10 and supported by the link 78 and brace 79 on the frame of the machine. A roll 81 is mounted in the rear end of said frame 80, and a belt 82 passes around said roll and the roll 74 the elevator 73 being removed. This belt is provided with a series of flat folds or crimps adapted to separate, fan-like, at the curve of the frame and allow the belt to make a right angle turn at that point. (Fig. 12.) Each fold is provided with a flat plate 84, preferably of sheet metal, fastened to the fold by rivets 85 and adapted to slide on guides 86 provided on said frame. (See Figs. 10, 11 and 12.) A shaft 87, corresponding to the one 72 on the binder deck, is mounted in the frame 80 and carries a centrally arranged sprocket 88 that engages the links of a chain corresponding to the one heretofore described which runs from the engine down to the rear compensating gear. Guides 89 are provided upon each side of said chain supported by arms 90 secured to the frame 80. One section of the chain travels above the sprocket 88 and the other below, the upper section being fed in one direction by the revolution of the shaft 87 and the other section in the opposite direction; resulting in continuous movement of the upper lead of the belt from the forward portion of the frame to the rear. (Fig. 11.) Any suitable means may be provided for securing the belt to said chain, but I prefer to provide metal clips 91 having their ends inserted through holes in the folds and through the metal plates 84, one of said ends having a slot 92 to receive the hook or eye at one end of the link, while the opposite end of the clip is bent under the opposite end of the link.

Fig. 13 illustrates clearly the manner of securing the belt on the chain. One fold is carried around the plate 84 and doubled across the top and then continued to the next link, where the operation is repeated and continued throughout the length of the chain. The clips serve to hold the folds in place, preventing them from opening up and acting as a swivel along the center line of the belt to allow its outer edge to spread in the form of a fan and the inner edge to contract the folds sliding over one another and permitting the belt to follow the sharp turn in the frame. In this way I am able to take the grass, particularly wire grass such as is used in the manufacture of matting, furniture and binder twine, and allow it to fall upon the knife bar platform in the usual way, deliver it to the elevator, and then in place of binding it with the ordinary binder mechanism discharge it upon the rearwardly extending belt which will carry the grass back from the rear end of the machine, turn it a quarter around and discharge it upon the ground in a row with the stalks lying in a direction substantially at right angles to the direction assumed by them in falling upon the platform from the cutter bar. The row can then be easily gathered up by the gleaner, and until such time as it is gathered up will be out of the path of the machine, and one row will be a sufficient distance from the contiguous ones to prevent the grass of the different rows from becoming tangled and interfering with the operation of the gleaner.

In Fig. 6 I have illustrated a modification in the device or mechanism employed for simultaneously oscillating all the traction wheels. In carrying out this modification I provide bell cranks 93 having arms connected by the bars 14, as described with reference to Fig. 1, and their other arms connected with the diagonally opposite ones by rods 94 provided with turn buckles 95. By oscillating the forward pair of these bell cranks a corresponding motion will be imparted to the rear pair to oscillate the rear wheels in the manner described with reference to the construction shown in Fig. 1.

In Figs. 17 and 18 I have illustrated still another modification in the construction of the running gear of the machine. In this construction the axles turn with the wheels on king bolts 96 that pass through the forward and rear frames 97 and 98 and through plates 99 that are secured to the hollow reach 100 and form guides for the semi-circular portions 101 and 102 of said forward and rear frames. The rear frame extends up over the middle portion of the reach and has bearings 103 thereon, and a shaft 104 is provided in said reach and has a compensating gear 105 through which the driving power is transmitted to the shaft, and shafts 106 are provided at each end of said driving shaft, and have universal joint connections 107 therewith, the pivots of these joints coinciding with the respective king bolts. The shafts 106 are geared to the cross shafts 108 that are connected by chains 109 with compensating gears 110 on the forward and rear axles, and through these chains a compensating gear power is transmitted from the driving shaft to all four of the traction wheels. A rod 111 connects the curved portion 101 of the forward frame with the diagonally opposite side of the rear frame, and a short section of rod 112 is connected by chains 113 and 114 with the other diagonally opposite sides of said frames, the chain 113 being sufficiently slack to wrap around the upright standard corresponding to the one heretofore described, which upon being turned will draw the said chain forward or back and oscillate the forward and rear axles to steer the machine.

I claim as my invention:

1. The combination, with a frame and the forward and rear axles and wheels therefor, of a hollow reach, a driving shaft therein geared to said axles, a hollow roll having a roller bearing on said reach and operatively connected with said driving shaft, an engine connected with said shaft, a series of sprockets secured on said hollow roll, and a knife bar and a platform belt and elevator operatively connected with said sprockets, substantially as described.

2. The combination, with a frame and the forward and rear axles and wheels therefor, of a hollow reach, a driving shaft therein geared to said axles, a hollow roll having an anti-friction bearing on said reach and connected with said driving shaft to be operated thereby, an elevator driven from said roll, and a frame rearwardly turned at one end and detachably connected at its forward end to said roll, and a belt carried by said frame and driven from said roll.

3. The combination, with a frame, of a hollow reach mounted therein, axles mounted on said frame and provided with traction wheels, a driving shaft arranged in said reach and geared to said axles, an engine mounted on said frame and connected with said driving shaft, a second shaft having a clutch provided with a belt connection with said driving shaft, a gear secured on said second shaft, and an elevating apron or belt operated from said gear.

4. The combination, with a frame and the forward and rear axles and wheels therefor, of a hollow reach, a driving shaft therein geared to said axles and composed of two sections, a compensating gear mounted on said driving shaft sections, an engine geared to one side of said compensating gear, a second shaft having a clutch provided with a belt connection with the other side of said compensating gear, and a cutter bar and an apron or belt shaft driven from said second shaft, substantially as described.

5. The combination, with a wheeled frame, of a hollow reach mounted therein, a driving shaft within said reach and geared to the axles of said frame, a roll having an antifriction bearing on said reach and operatively connected with said driving shaft, an elevator frame mounted on said roll and provided with a belt and extending laterally on the grainward side of the machine, and a second frame also mounted on said roll to receive the material from said elevator belt and extending laterally on the stubble side of the machine, and means for driving said belt from said roll.

6. The combination, with a wheeled frame, of a cutter bar and its platform or carrier, an elevator forming a continuation of said platform, a frame arranged near the discharge end of said elevator and having a rearwardly curved end and a carrier belt mounted in said curved frame and arranged to receive the grain or grass from said elevator and turn it a quarter around and deposit it at the rear of the machine, substantially as described.

7. In a reaping machine, the combination, with an elevator frame and its carrier belt arranged on the grainward side of the machine, of a carrier frame having a rearwardly curved discharge end supported near said elevator frame, a carrier apron or canvas mounted on said carrier frame and composed of a series of overlapping folds, and plates for said folds, a drive chain or belt arranged along the middle line of said carrier apron and connected to said folds and plates, and said plates having a swivel action on said drive chain to allow said folds to open and said apron to follow the curve of said frame, substantially as described.

8. The combination, with a frame having forward and rear axles and wheels therefor, of a hollow reach, a driving shaft therein geared to said axles, a hollow roll journaled in said reach and operatively connected with said driving shaft, a frame having a rearwardly turned end, and a belt operating over said frame and connected with said roll.

9. The combination with a frame having carrying wheels and a driving shaft, of a roll operatively connected with said shaft, an elevator frame mounted on said roll and having a belt extending laterally of the frame on the grainward side, and a second frame removably mounted on said roll and extending laterally on the stubbleward side of the machine, substantially as described.

10. The combination with a frame having forward and rear axles and carrying wheels mounted to oscillate about vertical axes and having a steering mechanism, of a driving shaft geared to said axles, a hollow roll inclosing said shaft and driven therefrom, a reaping mechanism extending on the grainward side of the machine and operatively connected with said roll, brackets loosely mounted on said roll and projecting on the stubbleward side of the machine, a frame detachably mounted on said brackets, and a belt carried by said frame and operatively connected with said roll.

In witness whereof, I have hereunto set my hand this 21st day of March 1905.

CHARLES O. WYMAN.

Witnesses:
RICHARD PAUL,
C. MACNAMARA.